Figure 1:
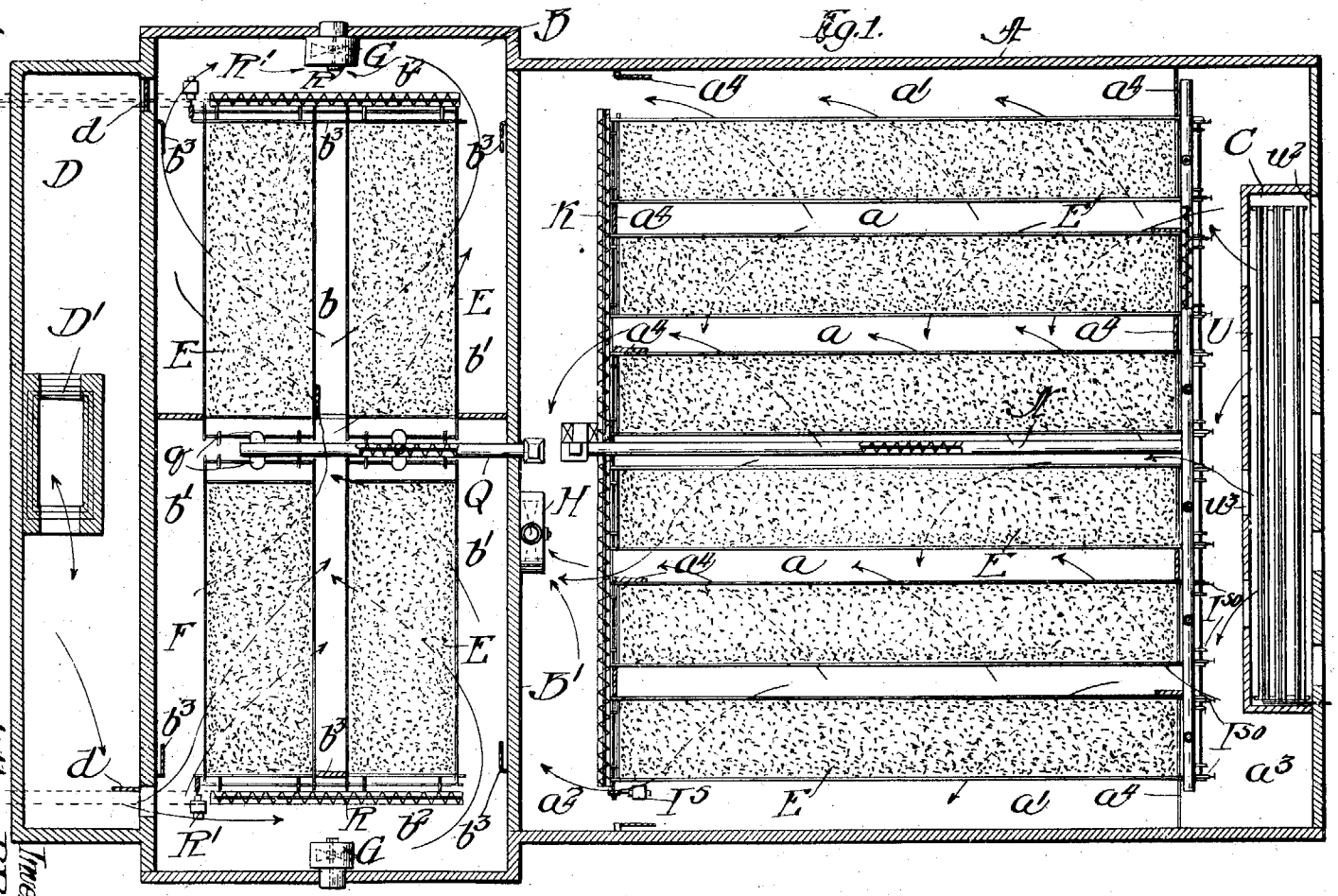

No. 12,728. REISSUED DEC. 3, 1907.

W. P. RICE.

MALT HOUSE AND APPARATUS.

APPLICATION FILED AUG. 23, 1906.

6 SHEETS—SHEET 1.

Witnesses:
T. N. Hardy
W. P. Hall

Inventor:
William P. Rice
by Poole & Brown
his Attorneys.

THE NORRIS PETERS CO., WASHINGTON, D.C.

No. 12,728. REISSUED DEC. 3, 1907.
W. P. RICE.
MALT HOUSE AND APPARATUS.
APPLICATION FILED AUG. 23, 1906.
6 SHEETS—SHEET 2.
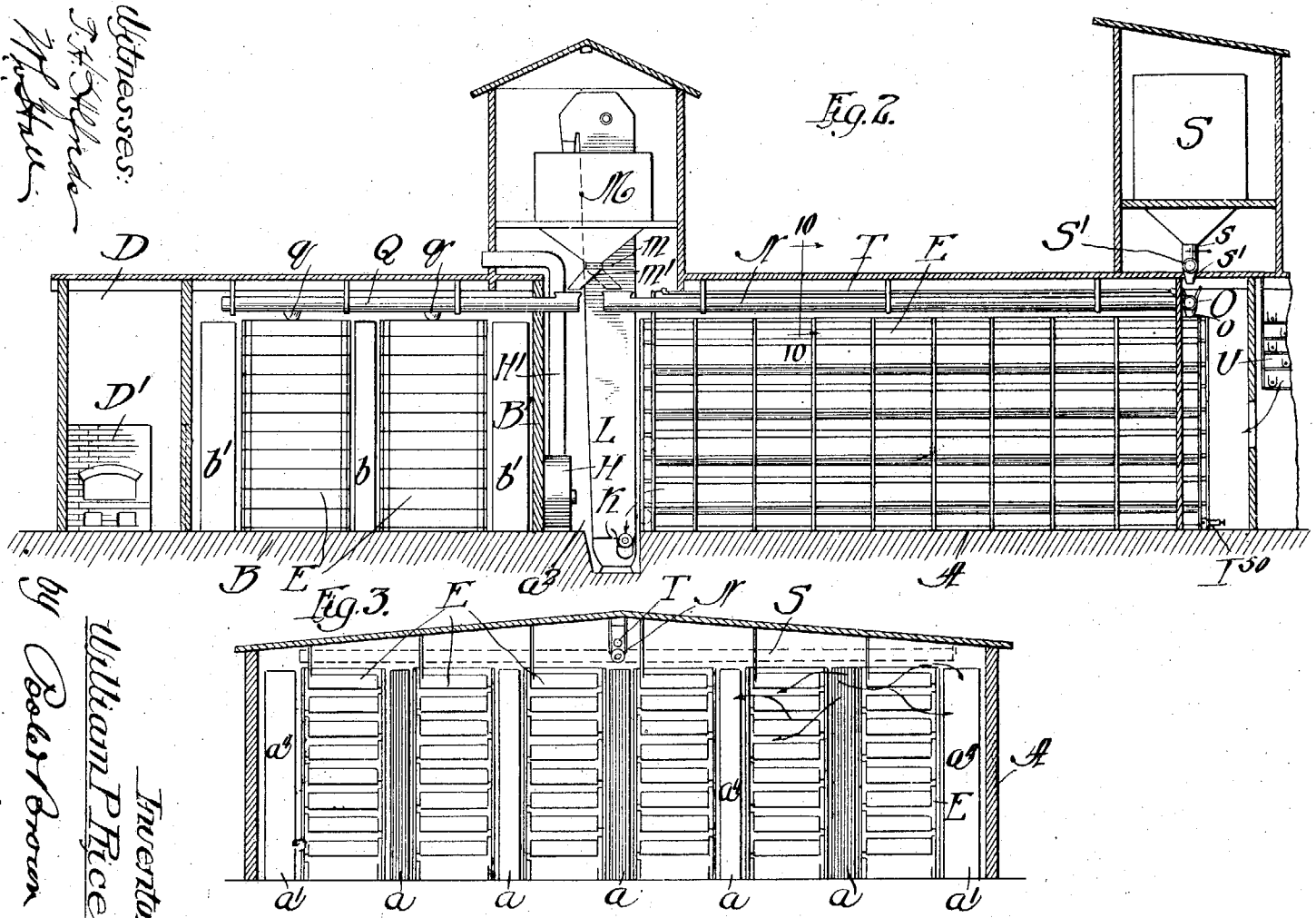
Witnesses:
T. H. Hinds
W. Hall
Inventor:
William P. Rice
by Pooler & Brown
his Attorneys
THE NORRIS PETERS CO., WASHINGTON, D. C.

No. 12,728. REISSUED DEC. 3, 1907.
W. P. RICE.
MALT HOUSE AND APPARATUS.
APPLICATION FILED AUG. 23, 1906.
6 SHEETS—SHEET 3.
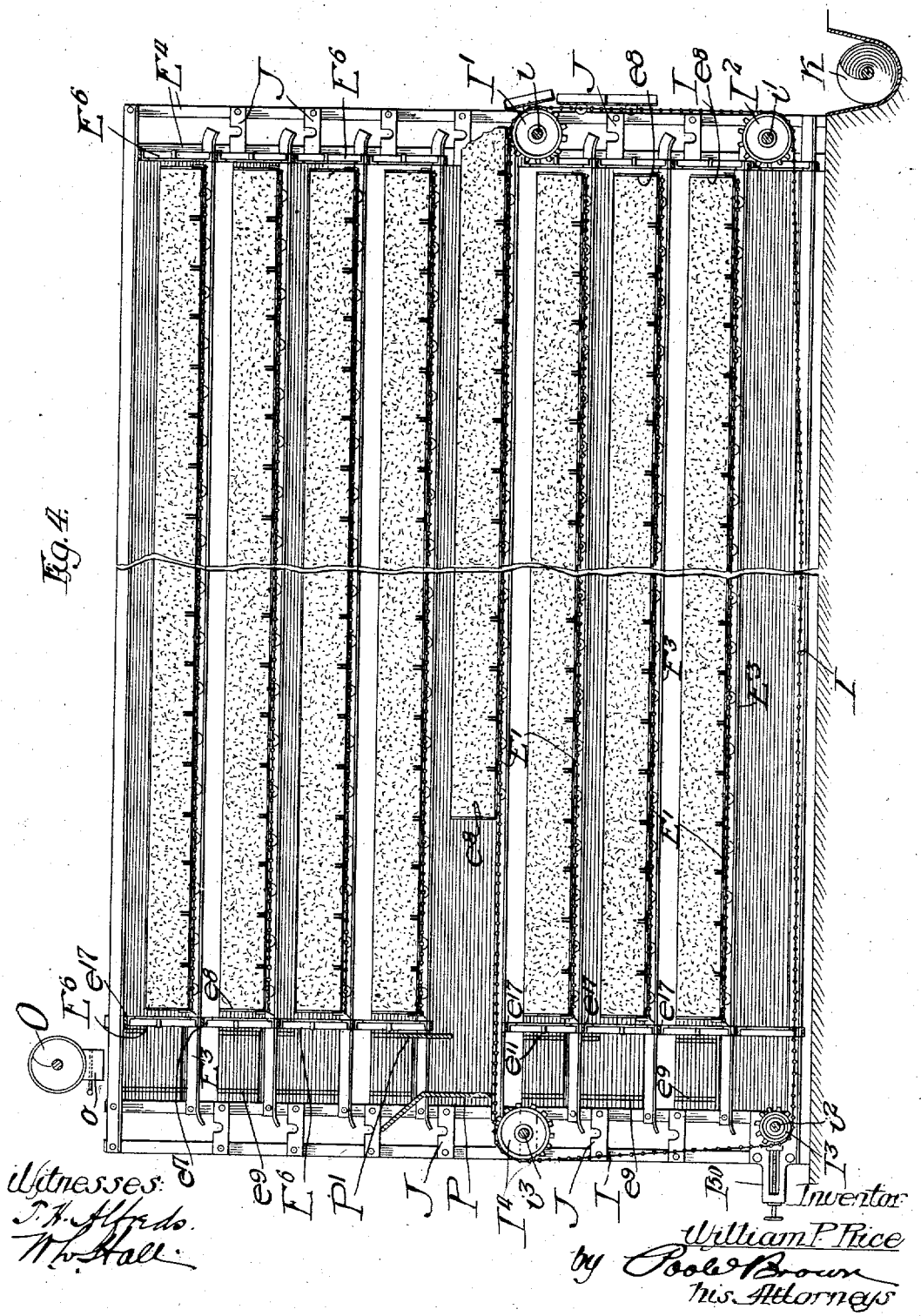
THE NORRIS PETERS CO., WASHINGTON, D. C.

No. 12,728. REISSUED DEC. 3, 1907.

W. P. RICE.

MALT HOUSE AND APPARATUS.

APPLICATION FILED AUG. 23, 1906.

6 SHEETS—SHEET 4.

Witnesses:
F. H. Alfreds
Wm. Hall

Inventor
William P. Rice
by Robert Brown
his Attorneys

THE NORRIS PETERS CO., WASHINGTON, D. C.

No. 12,728. REISSUED DEC. 3, 1907.
W. P. RICE.
MALT HOUSE AND APPARATUS.
APPLICATION FILED AUG. 23, 1906.
6 SHEETS—SHEET 5.
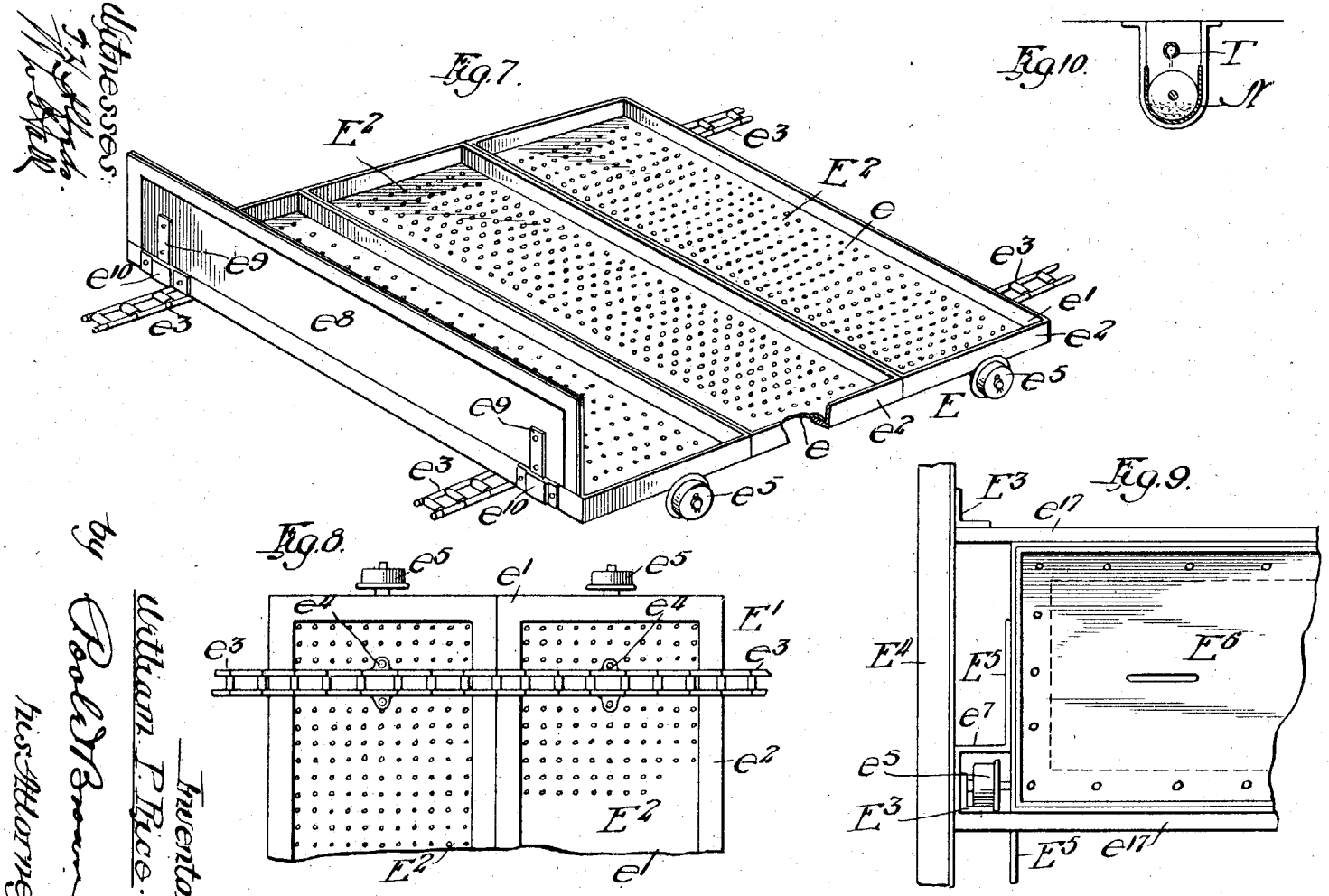
Witnesses:
F. H. Hoyt
W. B. Hall
Inventor:
William P. Rice.
by Poole & Brown
his Attorneys.
THE NORRIS PETERS CO., WASHINGTON, D. C.

No. 12,728. REISSUED DEC. 3, 1907.
W. P. RICE.
MALT HOUSE AND APPARATUS.
APPLICATION FILED AUG. 23, 1906.
6 SHEETS—SHEET 6.
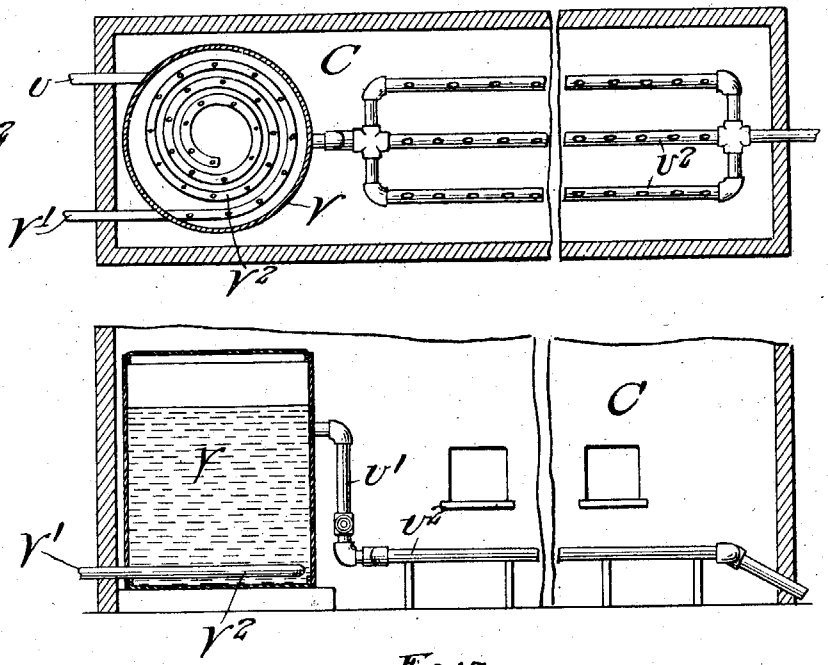
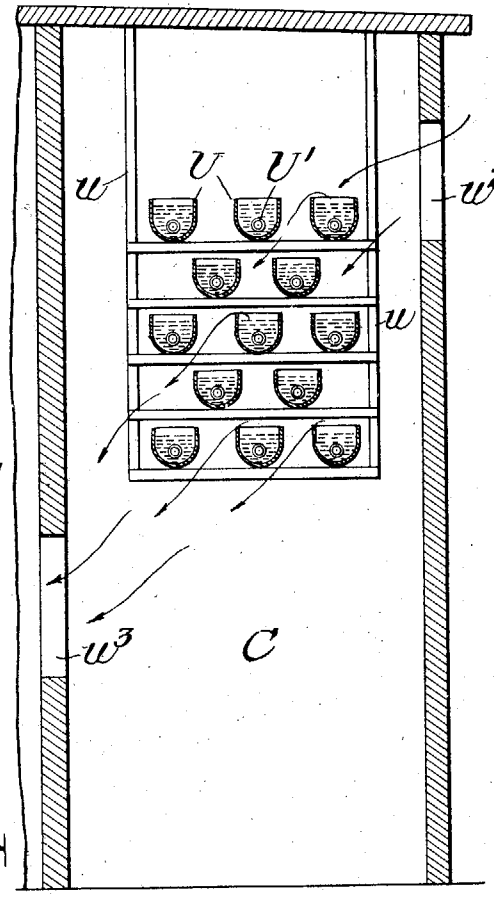
Fig. 11.
Witnesses:
T. H. Hefferds
W. H. Hall
Inventor
William P. Rice.
by Poole & Brown
his Attorneys.
THE NORRIS PETERS CO., WASHINGTON, D. C.

UNITED STATES PATENT OFFICE.

WILLIAM PAUL RICE, OF CHICAGO, ILLINOIS.

MALT-HOUSE AND APPARATUS.

No. 12,728. Specification of Reissued Letters Patent. Reissued Dec. 3, 1907.

Original No. 826,886, dated July 24, 1906, Serial No. 249,870. Application for reissue filed August 23, 1906. Serial No. 331,818.

*To all whom it may concern:*

Be it known that I, WILLIAM PAUL RICE, a citizen of the United States, of Chicago, in the county of Cook and State of Illinois, have invented certain new and useful Improvements in Malt-Houses and Apparatus; and I do hereby declare that the following is a full, clear, and exact description thereof, reference being had to the accompanying drawings, and to the letters of reference marked thereon, which from a part of this specification.

This invention relates to improvements in the art of producing malt, and refers more specifically to the construction of the malt-house and the apparatus in which and by which the grain from which the malt is produced is handled from the time it leaves the steeping-tub until it is dried and ready for storage or shipment.

The improvement embodying my invention embraces, in general terms, a suitable unit or compartment having a floor or shelf upon which the malt is supported, which shelf or floor is movable to dump the contents thereof outside the unit or compartment, said floor or shelf being perforated, and the parts being so arranged as to direct air in prescribed paths through the malt or said floor. The said floor or shelf may comprise a series of short sections flexibly joined together.

A further feature of my invention is embraced in dumping the contents of the floor or shelf into a suitable conveying apparatus which is constructed to convey said contents to the floor of the same or another compartment or unit.

The term unit as herein employed is intended to designate a suitable support for the grain supports or shelves and may be differently constructed from that herein shown.

My improvements are shown as embodied in an apparatus having the general construction shown in my prior United States Letters Patent No. 794,313, granted July 11, 1905. It embraces, in combination with a suitable room or apartment, one or more units located in such apartment and comprising a plurality of vertically-separated shelves upon which the malt is supported during the germination or drying process, the several shelves of each unit filling substantially the entire space between the floor and ceiling of the room or apartment. Certain of the improvements may, however, be applied to malting-houses and apparatus of a different type.

Among the objects of my present invention is to improve the construction and operation of the floors or shelves, to reduce the cost of handling the grain while being germinated and dried, to economize the turning of the grain, to provide improved means for wetting the grain during the germinating process, and also to provide an improved means for attemperating the air which is passed through the malt during the germinating process.

Figure 6:
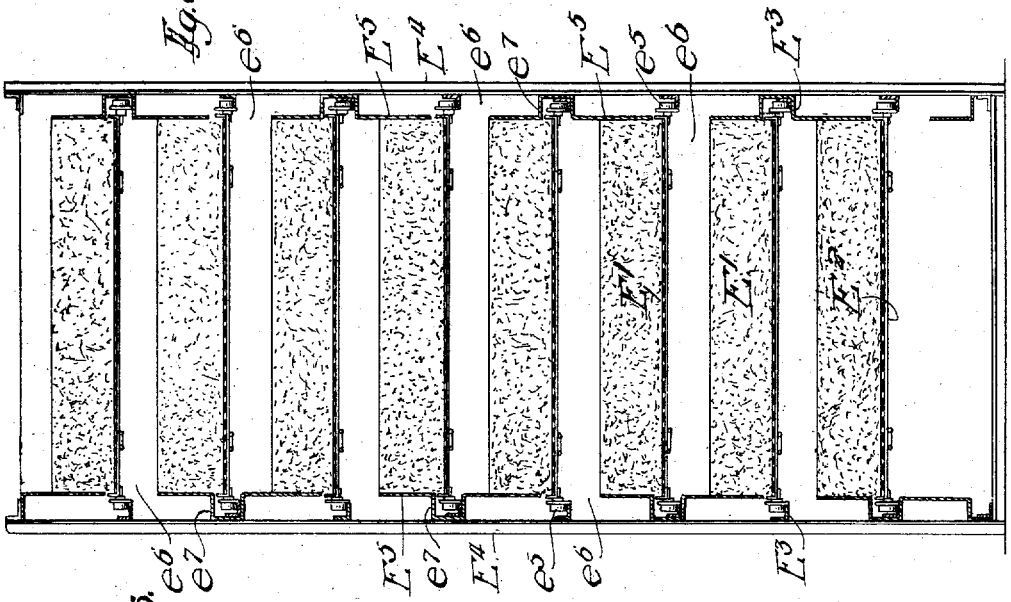
Figure 5:
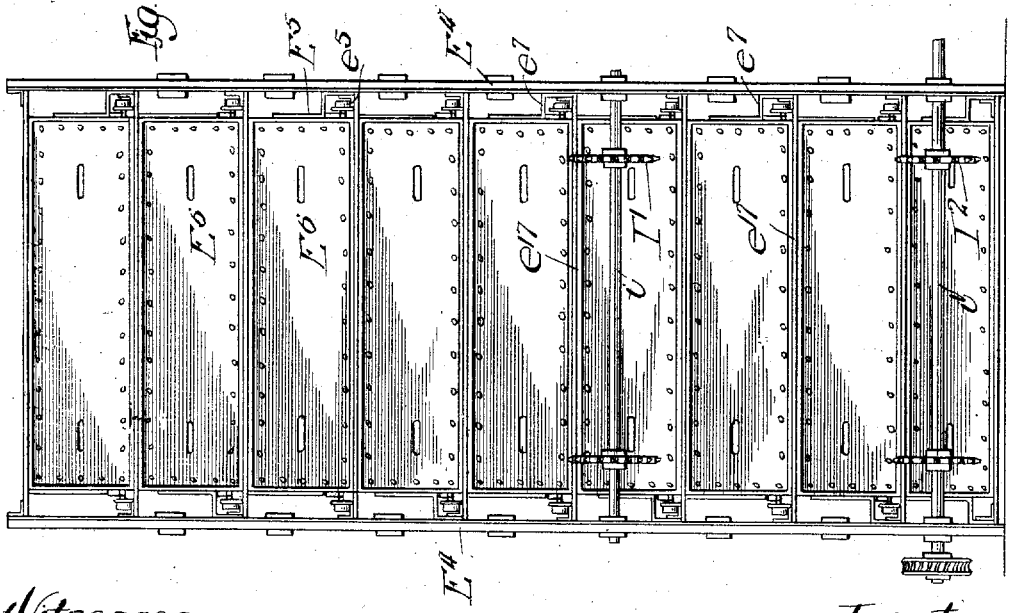

In the drawings, Figure 1 is a horizontal sectional view of a malt-house, and apparatus made in accordance with my invention. Fig. 2 is a longitudinal vertical section thereof. Fig. 3 is a transverse vertical section of the germinating part of the apparatus. Fig. 4 is an enlarged longitudinal section of the apparatus. Fig. 5 is an end view of one of the units. Fig. 6 is a transverse section thereof. Fig. 7 is a perspective detail of one of the shelves. Fig. 8 is a fragmentary bottom plan view thereof. Fig. 9 is a fragmentary detail showing one of the end sections of a unit and the manner of forming tight joints at its margins. Fig. 10 is a cross-section taken on line 10 10 of Fig. 2. Fig. 11 is a transverse section through the attemperating apparatus. Fig. 12 is a horizontal section, on a smaller scale, of a modified form of attemperating apparatus. Fig. 13 is a side elevation of the parts shown in Fig. 11.

Now describing the apparatus shown in the drawings, the malt-house consists for the most part of a single-story structure. The general division of the floor plan (shown in Fig. 1) embraces a germinating-room A, a drying-room B, an attemperating-room C, and a furnace D.

E E, Figs. 1 and 2, designate as a whole the malting units, located side by side in the germinating-room A, F F, designate as a whole the drying units, located side by side in the drying-room. The malting and drying units are made substantially alike in their construction, and the description which follows of the germinating units answers in all essential respects for the description of the drying units.

The germinating units E are separated from each other by aisles *a a* and from the side walls of the room by other aisles *a'*. Between the ends of said units and the wall B', dividing the germinating-room from the drying-room, on the one hand, and the opposite end wall of the building, on the other hand, are transverse aisles $a^2$ $a^3$, respectively. The attemperating-room C is shown as located in the end aisle $a^3$. Likewise the drying units are separated from each other by aisles $b$ and from the side walls of the drying-room by other aisles $b'$ and from the end walls of the drying room by transverse aisles $b^2$.

D′ designates a furnace in the furnace-room D, by which the air is heated for drying the malt, and said furnace-room communicates with the drying-room by doors $d$ located one at each end of the furnace-room. G G designate fans located in the end aisles $b^2$ for directing the air from said furnace room through said drying units. One of the fans is used at a time, depending upon the direction the air is to be directed through the units. When one of the fans is in operation, the furnace-room D at the opposite end of the drying-room only is open, the other door being closed. By varying the periods of operation, and inactivity of the fans and the opening and closing of the doors $d$ the direction of the drying-current through the units may be varied.

Located in the end aisle $a^2$ of the germinating-room is a fan H for drawing the air from the attemperating-room through the malt in the germinating units and discharging the same outside the building.

The features of construction above described are generally like the apparatus shown in my aforesaid patent, but may be varied within the scope of the invention.

Referring now to the construction of the improved units and the manner of handling the grain or malt, the same are made as follows: E′ E′, Figs. 4, 5, and 6, designate the shelves or floors of the malting units which as herein shown are superposed and vertically separated and upon which the malt is supported while being germinated. The said shelves are shown as occupying the space from the bottoms to the tops of the units, and the units are of a height to approximately fill the space from the floor to the ceiling of the room containing the same. Said shelves are made bodily movable or travel endwise of the units, so as to dump the grain or malt at the end of the units in the act of turning the malt or otherwise discharging the same from the units, and thereafter the shelves are moved or shifted backwardly into the units to receive the same or another charge of malt or grain. A practical form of said shelves comprises a series of transversely-disposed trays or sections $E^2$, (shown best in Figs. 7 and 8) which are so connected that when disposed in a straight line they constitute a continuous support for the grain, while at the same time the shelf is flexible to permit it to be trained or moved about driving and guiding pulleys. The tray-sections constitute dumping-sections, which are manipulated to dump their contents as they pass out of the unit at the end thereof, and so far as this feature of the invention is concerned the manner of moving the shelves out of the unit and dumping the sections thereof may be varied. Each tray, as herein shown, is provided with a perforated bottom $e$, made preferably of sheet metal and reinforced at its sides and ends by longitudinal and transverse angle bars, $e'$ $e^2$, as shown in Fig. 7 as herein shown, the tray-sections of each shelf are joined to constitute a flexible belt-like structure by two parallel chains or belts $e^3$ $e^3$, extending transversely beneath the trays and connected in any suitable manner with the trays—as, for instance, by providing certain of the links of the belts with lugs $e^4$, which are riveted to the tray-bottoms, Fig. 8. Said shelves are supported and travel on rails $E^3$ $E^3$, located at the opposite sides of the units and attached to vertical posts or standards $E^4$ $E^4$, constituting with the horizontal rails the skeleton frame for the units. Said track-rails in the present instance consist of angle-bars, the webs of which are riveted to said standards and the flanges of which are horizontal and constitute the tracks proper. The manner of supporting the shelves from said rails consists in providing each tray at each end thereof with a supporting-wheel $e^5$, said supporting wheels being rotatively mounted on trunnions, extending oppositely from the ends of the trays. As herein shown, each tray is provided with but a single wheel at each end thereof, it being located near the transverse center of said end.

$E^5$ $E^5$ designate the side walls of the units, made, preferably, of sheet metal and supported in any suitable manner on the frame consisting of the connected vertical standards $E^4$ and the track-rails $E^3$. As herein shown, said side walls are located inside the planes of the standards and in line with the ends of the trays constituting the shelves.

The several compartments of the units are closed at their ends by end plates $E^6$ $E^6$, as shown more clearly in Figs. 4, 5 and 9. Said plates are preferably made of light sheet metal, reinforced at their ends by angle bars and engage closely at their ends the side walls of the compartments and fit at their sides between horizontal parallel bars $e^7$ $e^7$, which extend between said side walls and are attached to the under sides of the track or supporting rails. The side and end margins of said end-closing plates are provided with packing-strips $e^{17}$, as shown in Figs. 4, 5 and 9, which prevent the escape of air through the sectional end walls of the units.

As herein shown, the side walls of the several compartments of the units are provided with longitudinal openings $e^6$ to admit air to the compartments above the malt therein. In the present instance the side air-opening of one compartment is located on the side of the unit opposite the wall openings of adjacent shelves, so that air entering a compartment from one of the aisles passes either upward or downward through the shelves and the malt thereon of adjacent units and outwardly through an adjacent aisle. In the event of the air passing through all the compartments of a unit from one direction, as shown in certain of the views of my aforesaid prior patent, the air-passages and means for directing air through the aisles will be correspondingly changed. The tray-supporting rollers $e^5$ at one end of each tray projects through one of said side air-openings $e^6$ for engagement with the adjacent track-rail $E^3$. At the other or closed side of the compartment the wall $E^5$ is bent outwardly to form a channel $e^7$ to receive the adjacent rail and the supporting-wheels which travel thereon.

Each shelf or floor is provided at its end just inside the end plates $E^6$ with a vertical end plate $e^8$, which constitutes the end wall of the malt space of the compartment of which the shelf constitutes the bottom. The said end plates of the shelves fit closely at their ends the side walls of the compartment to prevent escape of grain or malt past the same. A convenient manner of fixing said end plates $e^8$ to the end trays of each shelf is shown in Fig. 7 and consists in providing said end plates with transverse bars $e^9$ $e^9$, which extend beyond the lower margins of said plates and enter suitable loops $e^{10}$ $e^{10}$, attached to the outer angle frame-bars of said trays. The shelves or floors arranged as thus described extend the full length of the compartments and support the malt while germinating and when moved endwise outwardly from said compartments in the manner hereinafter to be described or otherwise dump the malt or grain at one end of the unit, from whence it is redeposited upon the shelf of the same or another unit or is carried to one of the drying units.

The aisles $a$ $a'$ at the sides of the units constitute, as in my aforesaid prior construction, conduits through which air is distributed to the various units. Said aisles are closed at their ends by suitable air-tight partitions provided with door $a^4$, whereby only the aisles whose doors at the end thereof adjacent to the attemperating-room are open receive air directly from the attemperating-room. Similarly, the air passes from only said aisles $a$ $a'$ to the transverse aisle $a^2$, whose doors $a^4$ adjacent to said transverse aisle $a^2$ are open. When the side walls of the units are constructed, as herein shown, for the provision of lateral air-spaces which open for alternate compartments on opposite sides of the unit, the aisle on one side of each unit constitutes a high-pressure aisle, while the aisle on the other side constitutes a low-pressure aisle. In such arrangement each alternate aisle is open to the attemperating space or room and each other alternate aisle is open to the transverse aisle $a^2$—that is to say, an aisle $a$ $a'$ which is open at one end to the attemperating space is closed at its other end to the aisle $a^2$, containing the exhausting-fan H. In this manner air admitted through the open door of either of the aisles is directed from said aisle through the malt in the adjacent unit or units and thence to an adjacent aisle or aisles to the fan H. The aisles $b$ $b'$ between the drying units and between said units and the walls of the drying space or room are similarly provided with doors $b^3$ for controlling in a like manner the passage of air therethrough and through the units. Inasmuch as the drying-space B communicates with the furnace-room D through the medium of two doors $d$ $d$, one at each end of the furnace-room, by varying the opening and closing of said doors $d$ $d$ and correspondingly varying the opening and closing of the doors $b^3$ at the ends of the aisles in the drying-room I am enabled to change the direction of air through the drying malt in a manner similar to that described in my aforesaid patent. In some instances the change of the direction of the air-currents through the malt avoids the necessity of turning the malt in the drying units, for the reason that such reversal brings the drying-air with uniform effect to all of the grains of the malt being dried.

I have herein shown one practical means of dumping the malt from the shelves and thereafter redepositing the same upon the same or other shelves or directing the green malt to the drying units; but it will be understood that the mechanism of handling the grain after it is dumped from the moving shelves may be considerably varied without departing from the spirit of the invention. As herein shown, each shelf is adapted to be connected at its opposite ends with suitable conveying chains or belts that are trained about driving-pulleys located at the opposite ends of the units and passed beneath the lowermost shelf, the whole constituting an endless device a part of the length of which consists of a shelf, and are driven forwardly in such manner that the shelf is carried toward one end of the unit, from whence its load is dumped, and thence beneath the lowermost shelf and backwardly through the opposite end of the units to its original position in the compartment of which the shelf constitutes the bottom. As herein shown, a single set of forwarding chains or belts are employed to separately carry all of the shelves of a unit forwardly and return the same in the manner described.

In the drawings I I designate the forwarding chains or belts referred to and are adapted to be connected with the opposite ends of the connecting-chains of the shelf-sections. Said chains I are arranged one at each side of the unit and are trained over pulleys $I'$ $I^2$ $I^3$ $I^4$, which are mounted on shafts $i$ $i'$ $i^2$ $i^3$, said shafts being arranged in upper and lower pairs at each end of the machine. The lower shafts are stationary, while the upper shafts $I'$ $I^4$ are removable and are seated at their ends in brackets J J, arranged at appropriate levels with respect to the several shelves. Said brackets are affixed to adjacent standards $E^4$ at the ends of the units. The shaft $i'$ constitutes in the present instance the driving-shaft and is made of a length to extend transversely across all the units and is operated through the medium of a suitable motor $I^5$.

In order to accommodate the chains I to the several shelves of varying heights, said chains are constructed with detachable links, whereby sections of the chains may be removed or added to correspond with the different heights of the shelves. Tension devices $I^{50}$ facilitate the tightening and rearrangement of said chains when adapted to either of the shelves.

At the dumping end of the series of units, which in the present instance is adjacent to the drying-room and below the level of the lowermost shelf, is located a transverse screw conveyer K, having an open-topped shelf. The screw of said conveyer is formed on a continuous shaft and is made of right and left pitch on each side of the longitudinal center thereof, so as to convey the malt from both ends toward the center of the device. From the central part of said conveyer K rises a bucket elevator L, which discharges at its upper end into a hopper M, that is made of a capacity to receive the contents of one shelf. Said hopper is provided at its lower end with a valve $m$ and with a rotative discharge-spout $m'$, which is adapted to be carried by rotation thereof to the receiving end of a horizontal screw conveyer M, located centrally over the group of units and designed to carry the malt to a transversely-disposed screw conveyer, designated as a whole by O and located horizontally about the level of the uppermost shelves of the unit. Said conveyer O is provided with right and left hand screws, whereby the malt is carried outwardly in both directions from the central receiving part thereof. The shell of the screw conveyer O is provided with spouts $o$, one for each of the units, and said spouts are provided with valves, as indicated in Fig. 2, whereby the material may be delivered through either of the spouts to the shelves of its associated unit. In this manner the grain or malt dumped from one shelf may be redeposited on the same or other shelves of the same or other units.

The delivery of the malt or grain to a shelf at the receiving end of a unit begins at the time the advance end of the shelf passes into the receiving end of the unit, and such delivery continues until the shelf is fully received in the unit. Means are provided for facilitating the delivery of the malt or grain to the shelves in layers of predetermined thickness and suitably leveling the tops thereof. A suitable structure for this purpose is shown in Fig. 4 and is made as follows: P, Fig. 4 designates a plate at the receiving end of the unit adapted to extend transversely between the side walls of the compartments in the parts thereof which project beyond the end plates $E^6$. Said plate P is held in place by engagement with suitable grooves $e^9$, formed near the outer ends of said side walls and constitutes the outer wall of the combined hopper and leveling-box. $P'$ designates a second plate, constituting the inner wall of said combined hopper and leveling-box and is located a distance inside the first plate and just outside the plates of the end plates $E^6$. Said plate $P'$ is also held in place by engagement with the grooves $e^{11}$ in the side walls of the compartments. Said plate $P'$ is made narrower than the plate P and is located with its upper end above the shelf a distance equal to the desired thickness of the layer of grain or malt on the shelf. A shelf traveling under said hopper receives the grain and carries it forwardly in a depth of layer determined by the space between the lower margin of the inner wall $P'$ of the combined hopper and leveling-box and the shelf. The two plates P $P'$ shown being removable may be applied to load any of the shelves. When loading a shelf in the manner described, the shelf is advanced until it is contained entirely in the compartment, at which time it is arrested and remains stationary until the contents of the shelf are again to be dumped. The hopper M constitutes a reserve-hopper located in the return-circuit of the grain or malt on its way from the dumping to the receiving ends of the units, it being necessary to temporarily store the malt or grain when turning the same until each shelf is returned to its compartment in position to receive the same.

When the contents of a unit is to be dumped, either for the purpose of discharging the grain therefrom or turning the grain or malt, the circulation of air is discontinued and the end plates of the compartments to be dumped are removed. The chains or belts I are thereafter adjusted to the first shelf to be dumped, the forward plates $e^8$ of the shelf removed, and the motor set in motion. The contents of each shelf is dumped therefrom as it turns over the pulleys $I'$ $I^2$, and the shelf is carried thence beneath the lowermost shelf of the unit and back to its compartment at the receiving end of the unit.

When the forward end of the traveling shelf reaches the receiving end of its compartment, the front end plate $e^8$ is set in place, and when the shelf is fully in the compartment the rear plate is set in place. After all the shelves have been thus dumped the end plates $e^6$ of the compartment are set in place between the bars $e^{17}$.

Inasmuch as the details of the drying units F are essentially the same as those of the germinating units just described, the former have not been illustrated in detail. As herein shown, the capacity of the drying units is practically one-third of that of the germinating units, and this scheme is followed in processes wherein six days are required for growing or germinating the malt and two days for drying. Preferably the layers of malt in the drying units are somewhat thinner than in the germinating units. The receiving ends of the drying units are located adjacent to each other, and the green malt after germination is transferred to the drying units by being first delivered to the hopper M and thence delivered through the swinging spout $m'$ thereof into the receiving end of a conveyer Q, having branches $q$, which are directed to the receiving ends of the drying units. Said branches $q$ are valved, so as to limit the passage of the malt through any one of them.

In the operation of the apparatus the germinating units are preferably loaded, so that the contents of one will be ready for unloading each day, each day's batch or piece being loaded into two of the drying units. Inasmuch as the two associated units on each side of the drying-space are of practically the same capacity as a single germinating unit and the further fact that two days are required for drying, it will be seen that one of the pair of drying units will be also unloaded each day, so as to leave a drying unit ready to receive the contents of a germinating unit loaded thereinto. If the period of malting and drying be varied, the proportions of the apparatus will of course be correspondingly varied.

By reason of the fact that provision is made for reversing the currents of drying-air in the drying units it will ordinarily be unnecessary to turn the malt in said units. If, however, it be found desirable or expedient to turn the same, the same apparatus may be employed in connection with said drying units as is shown in connection with the germinating units. After the malt has been thoroughly dried it is discharged from the units by movement of the shelves, constructed as described in connection with the malting units, into open conveyers R R, the screw-shafts of which are operated by motors R′ R′. Said conveyers R may discharge directly into a storage-house or communicate with a suitable conveying device that discharges into such storage-house.

A convenient location of the steep tub or tubs (designated by S in Fig. 2) is in a suitable compartment located over the receiving ends of the units. In practice a number of such tubs S are employed. The spouts $s$ thereof are valved and discharge into a horizontal conveyer S′, located over the conveyer O at the receiving ends of the units. The conveyer is provided with a spout through which the steeped grain is delivered to said conveyer O and thence to the several shelves of the units.

As a further and separate improvement I have provided means for wetting the grain during the turning process described. I have herein shown one approved apparatus for effecting this result; but it will be understood that the construction of such mechanism may be widely varied. As herein shown, the malt is dampened while passing through the conveyer N. For this purpose the casing of said conveyer is made open at its top, and water is delivered thereto through a pipe T, extending horizontally above the conveyer and provided with outlet-openings at its lower side, as shown in Figs. 2 and 10. A practical advantage of wetting the malt while passing through the conveyer is that the malt is at such time disposed in a relatively thin mass, whereby the water is directed uniformly to the individual corns of the malt or grain, thus uniformly moistening the same. When the malt is dampened while in thick layers or masses, as ordinarily formed on the usual malt-floor, the tendency of the dampening-water is to flow irregularly through the mass in the form of rivulets, so that parts of the malt are unduly moistened, while other parts thereof are scarcely moistened.

In Figs. 11 and 12 I have shown a form of attemperating apparatus designed more specifically for use in cold weather and when it is necessary, therefore, to heat the air before it is introduced into the germinating-room. To this end it is proposed to commingle the air to be attemperated with steam and to effect the commingling of the steam and air under conditions that do not tend to cool the air. In Fig. 11 the attemperating-chamber is provided with a group of open-sided troughs U, containing water, and the water is heated by steam-pipes U′, located in said troughs. The troughs are supported on a rack consisting of connected, vertical, and horizontal bars $u$ $u'$, respectively supported in the chamber in any suitable manner. The air enters the chamber near the top thereof through an opening $u^2$ and passes therefrom through an opening $u^3$ to the germinating-room. In Figs. 12 and 13 I have shown a modified form of such apparatus which is made as follows: V designates a tank, shown as located in the attemperating-room, but may be located outside of the same. Said tank contains a body of water and is made strong to resist high internal pressure. The water is heated in said tank in any suitable manner, as by forcing steam under high pressure thereinto, as through the pipe V′ and perforated terminal coil $V^2$, located in the bottom of the tank. Water is supplied to the tank through a supply-pipe *v*, and the heated water is discharged therefrom through a pipe *v*′. The outlet-pipe discharges into a group or coil of pipes $v^2$, which are perforated, as herein shown, or may be entirely opened at their upper sides. The water being suddenly released from a high pressure under which it is maintained in the tank to atmospheric pressure, which obtains in the pipe $v^2$, vaporizes and produces steam. The presence of the troughs U and heating-pipes U′, in the attemperating-room in one form of apparatus and the discharge of the highly-heated water into the pipes $v^2$ in the other form of apparatus, which is converted into steam when pressure thereon is reduced, affords a supply of heat in the attemperating-room which counteracts the cooling effects of the evaporation of the water of the steam by the air, and therefore enables me to raise the incoming air to a suitably-high temperature.

From the foregoing it will be observed that the handling of the malt is practically automatic from the time the malt is delivered into the germinating units until it is discharged from the drying units, the only manual labor required being that necessary to connect the chains I with the moving sectional shelves and for removing and replacing the end walls $E^6$ of the compartment and the end part $e^8$ of the shelves, as well as changing the position of the sprocket-shafts *i* $i^3$. This work may be conveniently conducted by one attendant and at most not more than two, thereby enabling a large amount of malt to be handled with a minimum expense of manual labor. This results in an economical production of the malt and enables the steps of producing the malt to be regularly conducted, thereby insuring a uniform grade of malt.

While I have shown my invention as embodied in an apparatus embracing units comprising a series of superposed shelves or floors, it will be obvious that the operative combination is complete when embraced in a single unit or compartment, its moving floor and means for forcing air through the floor and contents thereof, for the purpose set forth.

I claim as my invention:—

1. In a malting apparatus, a malting unit having a movable foraminous malt support constructed by its movement to dump the contents thereof entirely from the unit, means whereby the support is loaded from a loading device located outside the unit and means for directing air in prescribed paths through said foraminous support and the contents of the unit.

2. In a malting apparatus, a traveling foraminous malt support constructed to be moved endwise toward one end of the unit to dump the contents thereof, means for directing air in a prescribed path through said support and the contents thereof, and a conveying apparatus arranged to receive said dumped contents and constructed and arranged to direct said contents on to the same or another support.

3. A malting unit comprising inclosing walls, a malt support, and means for directing air through said support and the contents thereof, said support consisting of a plurality of short perforated sections flexibly joined together and means for advancing the support towards the end of the unit for dumping the contents thereof.

4. In a malting unit, a plurality of closely-spaced, vertically-separated shelves and a frame common to and supporting all said shelves, said shelves being made of a plurality of dumping-sections, and means for moving the shelves severally toward and out of one end of the unit to dump the contents of each of said shelves from the unit.

5. In a malting unit, a plurality of vertically - separated, closely - spaced shelves, each comprising a plurality of dumping-sections joined flexibly together, a frame provided with a series of tracks on which said shelves are severally supported, and means for advancing said shelves severally toward and out of one end of the unit for dumping the contents of each shelf from the unit.

6. A malting unit comprising a plurality of vertically - separated, closely - spaced shelves, a frame therefor, walls inclosing said shelves, means for directing air to the contents of said shelves, said shelves comprising a plurality of short sections joined flexibly together, and means for severally advancing the shelves toward and out of one end of the unit for dumping the contents thereof.

7. A malting unit, a plurality of closely-spaced, vertically-separated shelves, and a frame therefor embracing side and end inclosing walls, said shelves each embracing a plurality of short sections joined flexibly together, tracks on the frame for supporting said shelves, means for moving said shelves severally toward and out of one end of the unit to dump the contents of the same at the end of the unit, and means for directing said shelves backwardly and into the unit.

8. In a malting unit, a plurality of closely-spaced vertically-separated shelves and a frame therefor including side and end inclosing walls, said shelves each embracing a plurality of dumping-sections joined flexibly together, tracks on the frame for supporting said shelves, means for moving said shelves severally toward one end of the unit to dump the contents thereof, means for again directing said shelves into the unit, and means for loading each shelf as it passes into place in the unit.

9. In a malting unit, a plurality of vertically-separated compartments, movable shelves, constituting the bottoms of said compartments and comprising a plurality of short sections flexibly joined together, tracks on which said shelves are supported, means for severally moving said shelves toward one end of the device to dump the contents thereof, and means for thereafter carrying each flexible shelf beneath the lowermost shelf of the unit and directing the same to its compartments through the end of the unit opposite said dumping end.

10. In a malting unit, a plurality of vertically-separated compartments, movable shelves constituting the bottoms of said compartments and comprising a plurality of short sections flexibly joined together, tracks on which said shelves are supported, means for severally moving said shelves toward one end of the device to dump the contents thereof, and means for thereafter carrying each flexible shelf beneath the lowermost shelf of the unit and directing the same to its compartments through the end of the unit opposite said dumping end, and means for loading each shelf as it enters its compartment in the unit.

11. In a malting unit, a plurality of vertically-separated compartments, movable shelves constituting the bottoms of said compartments and comprising a plurality of short sections flexibly joined together, tracks on which said shelves are supported, means for severally moving said shelves toward one end of the device to dump the contents thereof, and means for thereafter carrying each flexible shelf beneath the lowermost shelf of the unit and directing the same to its compartments through the end of the unit opposite said dumping end, and means for loading each shelf as it enters its compartment in the unit, including a combined hopper and measuring-box located over each belt as it enters the unit.

12. A malting unit comprising a frame embracing side and end inclosing walls, a plurality of closely-spaced, vertically-separated shelves occupying the space therein from the bottom to the top thereof, and constituting a plurality of separate compartments, means for admitting air to the contents of the several shelves, said shelves each comprising a plurality of short, flexibly-connected sections, and means for moving said shelves severally to and out of one end of the unit to dump the contents thereof and operating thereafter to carry said shelves beneath the lowermost compartment and back to the end of the unit opposite the dumping end thereof.

13. A malting unit comprising a frame embracing side and end inclosing walls, a plurality of closely-spaced, vertically-separated shelves supported in the frame and occupying the space from the bottom to the top thereof, and constituting a plurality of separate compartments, means for admitting air to the contents of the several shelves, said shelves each comprising a plurality of flexibly-connected sections, tracks on the frame on which said shelves are supported, means for moving said shelves severally to and out of one end of the unit to dump the contents thereof and operating thereafter to carry said shelves beneath the lowermost compartment and back into the end of the unit opposite the dumping end, and means for loading each shelf as it passes into its compartment, including a leveling-box constructed and designed to determine the thickness of the layer deposited on said shelf.

14. In a malting unit, an inclosing frame, a shelf upon which the malt is supported, said shelf embracing a plurality of flexibly-connected sections whereby it may pass around directing-pulleys, rails on which said shelf is supported, and means for advancing said shelf to and out of one end of the unit, comprising a belt detachably affixed at its opposite ends to the opposite ends of the shelf, and pulleys at the opposite ends of the unit about which said belt is trained.

15. A malting unit comprising a plurality of closely-spaced, vertically-separated shelves, a frame therefor including inclosing side and end walls parallel tracks extending from one end to the other of the unit for supporting the shelves, each shelf comprising a plurality of flexibly-connected sections, a belt adapted to be separately and detachably affixed at its opposite ends to the opposite ends of each shelf and pulleys at the opposite ends of the unit over which said belt is trained whereby either of the shelves may be advanced toward and out of one end of the unit to dump the contents thereof, and to be thereafter directed into the unit from the end opposite the dumping end.

16. A malting unit comprising a plurality of closely-spaced, vertically-separated compartments, a frame therefor including inclosing side and end walls, shelves constituting the bottoms of said compartments, means for admitting air severally to said compartments, tracks on said frame for supporting said shelves, each shelf being perforated and of flexible construction, means for moving the shelves severally toward and out of one end of the unit for discharging the contents thereof, and pulleys located at the opposite ends of the unit and arranged to guide each shelf beneath the lowermost compartment and to the end of its compartment opposite the dumping end of the unit.

17. A malting unit comprising a plurality of vertically-separated, closely-spaced shelves, a frame therefor including side and end inclosing walls, the shelves constituting the bottom of said separate compartments, means for admitting air to the several compartments, said shelves being of flexible construction, and means for moving the shelves toward and out of one end of the unit for dumping the contents of the same, thence beneath the lowermost shelf and directing the same into the unit from the end opposite the dumping end, comprising a chain belt trained beneath the lowermost shelf and adapted for detachable connection at its opposite end with the opposite end of either of said shelves, and upper and lower pulleys at the opposite ends of said unit about which the belt is directed, the upper pulleys being vertically adjustable to bring the same in line with either of said shelves.

18. A malting unit comprising a plurality of vertically-separated, closely-spaced shelves, a frame therefor including side and end inclosing walls, means for directing air to the several shelves, parallel tracks on said frame on which said shelves are supported, said shelves comprising a plurality of short sections joined by laterally-separated chains or belts and extending from end to end of the unit, laterally-separated chains or belts extending beneath the lowermost shelf and adapted for attachment at their opposite ends to the chains at the opposite ends of either of the shelves, upper and lower pairs of pulleys at each end of the unit over which said belts are trained, the lower pair of pulleys being permanently mounted, and the upper pair of pulleys being adapted to be raised and lowered to bring the same in line with either of said shelves.

19. A malting unit comprising a plurality of vertically-separated, closely-spaced shelves, a frame therefor including inclosing side and end walls, the shelves constituting the bottom supports for the compartments, tracks on which said shelves are supported, means for directing air to said compartments, said shelves being made of flexibly-joined dumping-sections, means for moving each shelf toward and out of one end of the unit for dumping the same for returning said shelf into place in its unit, the end walls of said unit being made sectional, each section adapted to close the end of one compartment, and said sections being removable to permit the shelves to be moved out of and into the unit.

20. A malting unit comprising a frame embracing inclosing side and end walls, a plurality of shelves supported in said frame, and dividing the inclosure into separate, superposed compartments, each being made perforated and of flexible construction, means for advancing the shelves to and through one end of the compartment for dumping the contents thereof and for redirecting the shelves into the unit, the end walls of the unit comprising each a plurality of sections, corresponding in width to the height of the compartments and removably supported in the frame in a manner to close the ends of said compartments.

21. A malting unit comprising a plurality of vertically-separated, closely-spaced shelves, the frame therefor including inclosing side and end walls said shelves dividing the interior of the unit into a plurality of separate compartments, means for directing air severally to said compartments, each shelf comprising a plurality of flexibly-connected short dumping-sections, means for advancing the shelves toward and through one end of the unit for dumping the contents thereof and for redirecting each shelf into its compartment, and means for loading each shelf as it enters its compartment comprising a removable, combined hopper and leveling-box.

22. A malting unit comprising a plurality of vertically-separated, closely-spaced shelves, a frame therefor including inclosing side and end walls, means for admitting air to said shelves, tracks in the frame for supporting said shelves, said shelves each comprising a plurality of tray-sections joined flexibly to each other and provided at their ends with rollers which rest and roll on said tracks, and means for advancing said shelves severally to and through one end of the unit for dumping the contents thereof.

23. A malting unit comprising a plurality of vertically-separated, closely-spaced shelves, a frame therefor including inclosing side and end walls, tracks for supporting said units, said shelves each comprising a plurality of tray-like sections two parallel chains or belts extending beneath and attached to the tray sections centrally thereof for flexibly connecting the same together, rollers at the end of said sections which rest and roll on said tracks, and means for advancing the sections toward and through one end of the unit for dumping the contents thereof and for carrying the shelves backwardly to the opposite end of the unit and redirecting it to its track.

24. An improved system or apparatus for producing malt comprising a room or apartment, a plurality of malting units located side by side on the floor of said room and separated by aisles constituting air-passages, each unit embracing a plurality of shelves located one above the other and substantially filling the space between the ceiling and floor, the shelves of each unit being supported by a frame comprising inclosing side and end walls, passages in said walls admitting air from said aisles to the contents of said shelves, said shelves being made of flexible construction, and means for advancing the shelves to one end of the unit for the purpose of dumping the contents thereof.

25. An improved system or apparatus for producing malt comprising a room or apartment, a plurality of malting units located side by side on the floor of said room, each embracing a plurality of shelves located one above the other, and upon which the grain or malt is arranged in layers, and shelves substantially filling the space between the ceiling and floor of the room, means for directing air through defined air-passages to the several shelves of said units, said shelves each embracing a plurality of flexibly-connected short-dumping sections, means for advancing each shelf toward and through one end of its unit for dumping the same and for redirecting the shelf into the unit.

26. An improved system or apparatus for producing malt comprising a room or apartment, a plurality of malting units located side by side on the floor of said room separated by aisles constituting air-passages, each embracing a plurality of shelves located one above the other, and substantially filling the space between the ceiling and floor, the shelves of each unit being supported by a frame comprising inclosing side and end walls, passages in said walls admitting air from said aisles to said shelves, said shelves being made of flexible construction, and means for advancing the shelf toward and through one end of the unit for the purpose of dumping the contents thereof and for directing the shelves to the units at the ends opposite to the dumping ends, and means for redepositing the malt so dumped upon the shelves as they enter said opposite ends of the units, comprising a conveyer located transversely across the dumping ends of the units and adapted to receive the malt as it is dumped from said shelves, a conveyer located transversely over the other ends of the units, means for directing the malt from said first conveyer to the second conveyer, said second conveyer being provided with a plurality of valved spouts located over the receiving end of the units.

27. An improved system or apparatus for producing malt comprising a single-story room or apartment, a plurality of malting units, each including a series of closely-spaced, separated shelves constituting the bottoms of compartments for the grain or malt, the compartments of the units substantially filling the space between the ceiling and floor of the room, means affording prescribed air-passages located on opposing sides of each unit, the air being directed from one passage through the unit and into the other passage, and each shelf constituting a plurality of short flexibly-connected sections, and means for advancing the shelves toward and through one end of the unit to dump the contents thereof.

28. An improved system for producing malt comprising a room or apartment, a malting unit therein, means for turning the grain or malt, comprising means for discharging the same outside the unit, and a conveying apparatus located outside the unit for receiving the grain or malt from and redepositing it in said unit, and means for dampening the grain while passing through said conveying apparatus.

29. In a malting unit, a plurality of closely-spaced, vertically-separated shelves, a frame common to and supporting said shelves, means for moving the shelves severally toward and out of one end of the unit to dump the contents thereof from the unit, and a conveying device having its receiving end located in receiving proximity to the dumping contents of each shelf and constructed to redeposit such contents upon the shelf from which it was dumped, as well as upon either of the other shelves of the units.

30. A malting unit comprising a frame provided with a plurality of horizontal tracks, a plurality of closely-spaced, vertically-separated shelves having rollers which rest on said tracks whereby the weights of the shelves and their contents are supported on said tracks, means for withdrawing the shelves from the unit to discharge the contents thereof outside the unit and means for directing air from the space outside the unit in prescribed paths over and through the contents of the shelves.

In testimony that I claim the foregoing, as my invention, I affix my signature in the presence of two witnesses this 17th day of August, 1906.

WILLIAM PAUL RICE.

Witnesses:

WILLIAM L. HALL,

GEORGE R. WILKINS.